United States Patent [19]
Chavez, Jr.

[11] Patent Number: 5,765,109
[45] Date of Patent: Jun. 9, 1998

[54] DIRECT ACCESS PAGING FOR WIRELESS SETS

[75] Inventor: David Lee Chavez, Jr., Thornton, Colo.

[73] Assignee: Lucent Technologies Inc., Murray Hill, N.J.

[21] Appl. No.: 582,565

[22] Filed: Jan. 3, 1996

[51] Int. Cl.$^6$ .................................................. H04M 11/00
[52] U.S. Cl. ........................................... 455/435; 455/453
[58] Field of Search ................................ 455/435, 452, 455/453, 458, 509, 510, 512, 513, 514, 515, 521, 524, 525, 417, 426, 434, 445, 464, 450

[56] References Cited

U.S. PATENT DOCUMENTS

| | | | |
|---|---|---|---|
| 5,202,912 | 4/1993 | Breeden et al. | 379/57 |
| 5,212,806 | 5/1993 | Natarajan | 455/33.2 |
| 5,222,123 | 6/1993 | Brown et al. | 379/57 |
| 5,226,071 | 7/1993 | Bolliger et al. | 455/435 |
| 5,311,570 | 5/1994 | Grimes et al. | 379/57 |
| 5,327,578 | 7/1994 | Breeden | 455/434 |
| 5,423,062 | 6/1995 | Sakakura | 455/434 |
| 5,428,663 | 6/1995 | Grimes et al. | 379/57 |
| 5,454,026 | 9/1995 | Tanaka | 455/453 |
| 5,574,973 | 11/1996 | Borth et al. | 455/435 |
| 5,615,249 | 3/1997 | Solondz | 455/450 |

*Primary Examiner*—William Cumming
*Assistant Examiner*—Myron K. Wyche
*Attorney, Agent, or Firm*—John C. Moran

[57] ABSTRACT

A PCS switching system where a wireless set registers on a base station regardless of whether the base station has capacity to complete a call for the wireless set. When an incoming call is received for the wireless set, a central computer providing overall control of the PCS system directs this call to a paging zone controller of a paging zone in which the wireless set is registered. If the base station does not have capacity to handle that call, the paging zone controller transmits a message via the base station and a paging channel to the wireless set informing the wireless set that a page is pending and that it must find a base station with idle capacity. The wireless set does this by listening to the paging channel until a base station is determined that has idle capacity. The base stations periodically transmit on the paging channel, and each of their messages includes the present capacity of the base station. The wireless set establishes communication with the new base station and ceases to be in communication with the original base station. Since the wireless set is already registered with the paging zone controller, it is not necessary for the paging zone controller to re-register the wireless set with the wireless switching network when the wireless set moves from one base station to another base station within the same paging zone.

12 Claims, 7 Drawing Sheets

FIG. 9

STATUS TABLE

| STATION ID | BASE STATION ON WHICH REGISTERED | ACTIVE | INITIAL REGISTRATION TIME |
|---|---|---|---|
| | | | |

COLUMN 901, COLUMN 902, COLUMN 903, COLUMN 904

DIRECT ACCESS PAGING FOR WIRELESS SETS

TECHNICAL FIELD

This invention relates to personal communication service systems, and, in particular, to the paging of wireless sets.

BACKGROUND OF THE INVENTION

Within the art, personal communication service (PCS) is provided in paging zones. The PCS switching system identifies each registered wireless set as being in a particular paging zone. When the PCS system receives an incoming call for a particular wireless set, the PCS system requests that all base stations within the paging zone of the wireless set transmit messages (paging messages) requesting that the wireless set identify itself to one of the base stations. A paging zone is normally related to a physical space. In addition, a paging zone can have a number of wireless base stations so as to provide high call capacity within a given paging zone. In general, each PCS base station can handle a small number of wireless sets that are actively engaged in a telephone call. This number varies from two to twelve active wireless sets at any given time. Within a paging zone, a paging zone controller provides overall control for all of the wireless base stations within that paging zone. In the prior art, when a incoming call is received for a wireless set by the PCS switching system, the latter system transfers the incoming call to the paging zone controller controlling the paging zone in which the PCS wireless set is registered. Upon receiving the incoming call, the paging zone controller requests that all base stations send a paging message to the destination wireless set. In PCS switching systems, there can be hundreds of wireless base stations within a paging zone. This results in very expensive algorithms and expenditure of a large amount of real time to accomplish transmitting messages to all of the base stations within the paging zone. The base stations transmit the paging message over what is often referred to as a paging channel which is shared by all of the base stations.

The user of PCS switching systems want large paging zones so that they will have high call capacity within a given physical area. Similarly, since each time a wireless set enters a new paging zone it must reregister, the vendors of PCS switching systems want large paging zones so as to reduce the number of registrations that must be performed by the PCS switching system. Each registration requires processing time by the PCS switching system.

SUMMARY OF THE INVENTION

The foregoing problems are solved, and a technical advance in the art is achieved, by a PCS switching system where a wireless set registers on a base station regardless of whether the base station has capacity to complete a call for the wireless set. When an incoming call is received for the wireless set, a central computer providing overall control of the PCS system directs this call to a paging zone controller of a paging zone in which the wireless set is registered. If the base station does not have capacity to handle that call, the paging zone controller transmits a message via the base station and a paging channel to the wireless set informing the wireless set that a page is pending and that it must find a base station with idle capacity. The wireless set does this by listening to the paging channel until a base station is determined that has idle capacity. The base stations periodically transmit on the paging channel, and each of their messages includes the present capacity of the base station. The wireless set establishes communication with the new base station and ceases to be in communication with the original base station. Since the wireless set is already registered with the paging zone controller, it is not necessary for the paging zone controller to re-register the wireless set with the wireless switching network when the wireless set moves from one base station to another base station within the same paging zone. However, the paging zone controller and wireless set are exchanging information which allows the paging zone controller to precisely know with which base station each wireless set is currently communicating over the paging channel within the paging zone. Hence, only the paging zone controller is involved in the operation of the wireless set transferring from the original base station to the new base station. Advantageously, regardless of the number of base stations within a paging zone only two messages are required in the worse case to complete an incoming call to a wireless set within the paging zone. Further, since the wireless set remains registered on a particular base station and paging zone controller until it becomes active within the paging zone, the central computer receives a greatly reduced number of registration requests.

These and other advantages and features of the invention will become apparent from the following description of the illustrative embodiment of the invention taken together with the drawing.

BRIEF DESCRIPTION OF THE DRAWING

FIG. 9 illustrates a status table.

DETAILED DESCRIPTION

Figure 1:
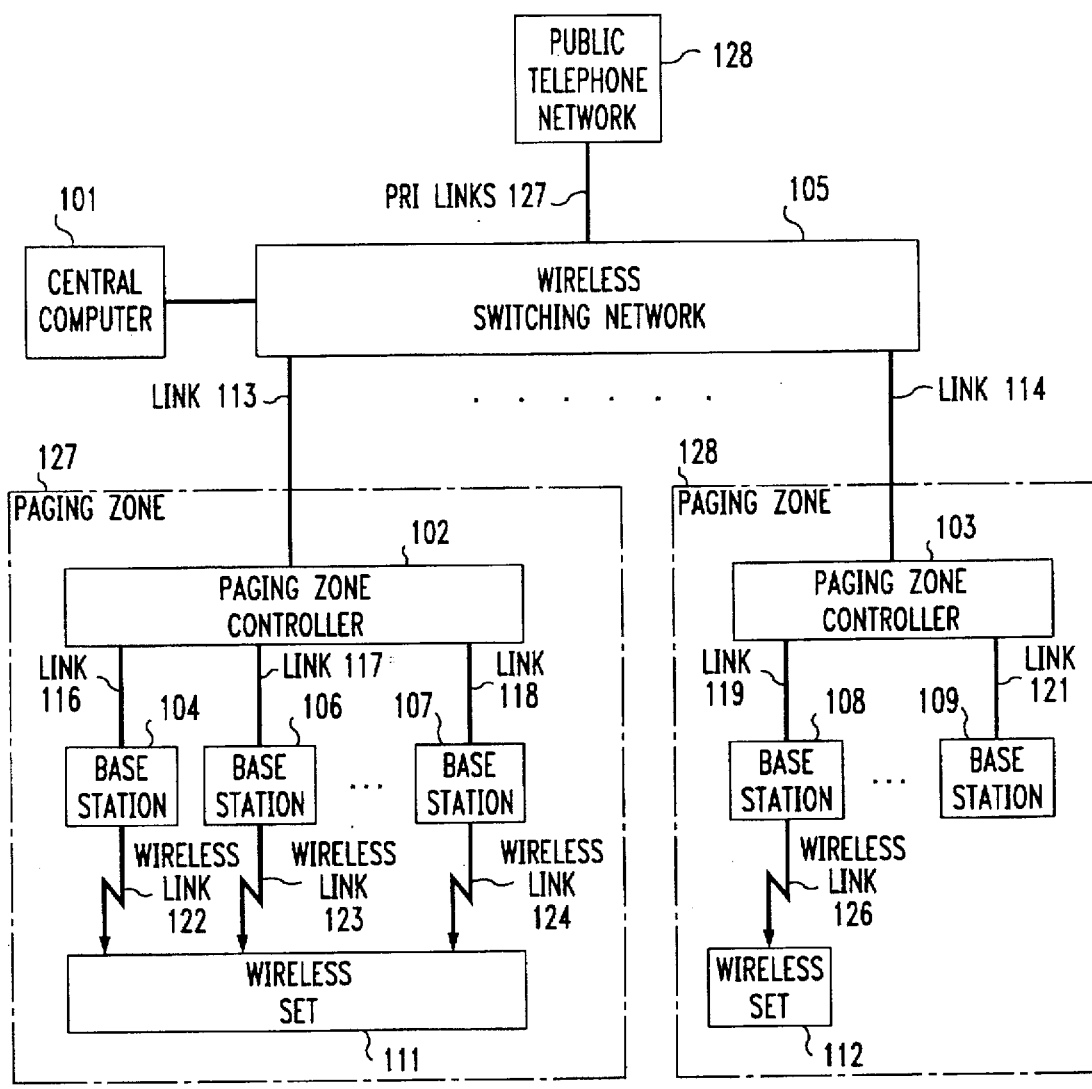
FIG. 1 illustrates, in block diagram form, an embodiment of the invention.

FIG. 1 illustrates a wireless switching system. Central computer 101 provides overall control of the wireless switching system, and switching network 105 interfaces the wireless switching system to public telephone network 128 via primary rate interface (PRI) links 127. Central computer 101 receives control information as ISDN messages from public telephone network 128 and paging zone controllers 102–103 via switching network 105. Each paging zone is controlled by a paging zone controller. For example, paging zone controller 102 controls paging zone 127. Paging zone controller 102 controls the base stations 104 through 107 within paging zone 127. Paging zone controller 102 communicates with central computer 101 via link 113. Link 113 may be a PRI link or other communication links. Paging zone controller 102 is interconnected to base station 104 via links 116 through 118. Each of these links may be one or more basic rate interface (BRI) links or a PRI link. The base stations communicate with wireless sets such as wireless set 111 via wireless links 122 through 124. One air protocol that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Paging zone controller 103 communicates with central computer 101 via link 114. Further, paging zone controller 103 communicates with base stations 108 through 109 via links 119 through 121. As indicated in FIG. 1, there can be a plurality of paging zones each controlled by a paging zone controller. A wireless set, such as wireless set 111, is only registered on one base station at a time; however, the wireless links of FIG. 1 illustrate that the wireless set is receiving the paging channel from all of the base stations within a given paging zone. However, as a practical matter, the wireless set will only receive the paging channel with those base stations within radio range. The wireless set must be receiving the paging channel from the base station on which the wireless set is registered. If not, the wireless set must register on another base station.

To understand the operation of the wireless switching system illustrated in FIG. 1, consider the following example. When wireless set 111 first comes into the paging zone controlled by paging zone controller 102, wireless set 111 registers on base station 104. During this registration, paging zone controller 102 informs central computer 101 that wireless set 111 is in paging zone 127. In addition, paging zone controller 102 marks wireless set 111 as being registered on base station 104. When an incoming call is received by central computer 101 via switching network 105 for wireless set 111, this call is routed via link 113 to paging zone controller 102. If base station 104 has idle talk channels in link 116 (B channels if link 116 is a PRI or BRI link), paging zone controller 102 completes the incoming call to wireless set 111 via base station 104. If there are not spare talk channels in link 116, paging zone controller 102 transmits a message to wireless set 111 via base station 104 informing wireless set 111 that there is an incoming call for the set and that the set must find a base station that has idle talk channel capacity on the link interconnecting the base station to paging zone controller 102. This message is referred to as a pending page message. In response to the pending page message, wireless set 111 monitors for another base station within its radio range and paging zone which has idle capacity to handle this call. Each base station transmits its identity and idle call capacity on the paging channel periodically. If such a base station cannot be found, the wireless set notifies the user of the wireless set utilizing a display message, audio alert, or a vibration indicating that a call is pending but no base station within the paging zone and radio range has idle call capacity. In response to this alerting, the user could then move to another base station within the zone or encourage another active user to terminate their call so as to provide call capacity for the user to answer the pending call. For example, if base station 107 has idle call capacity, wireless set 111 will register with base station 107 in order to receive the incoming call. Paging zone controller 102 is aware that there is an incoming call for wireless set 111 and is responsive to the registration on base station 107 to direct the incoming call to wireless set 111 via base station 107. Since wireless set 111 has not left paging zone 127, paging zone controller 102 does not report the registration of wireless set 111 on base station 107 to central computer 101. This manner of handling registrations within a paging zone greatly reduces the registration processing operations of central computer 101.

When wireless set 111 leaves the paging zone controlled by paging zone controller 102 and moves into the paging zone controlled by paging zone controller 103, wireless set 111 must register on one of the base stations 108-109. For example, if wireless set 111 registers on base station 108, paging zone controller 103 processes this registration with central computer 101. Central computer 101 now records that wireless set 111 is in paging zone 128. With respect to paging zone controller 102, in a first embodiment, central computer 101 is responsive to the registration of wireless set 111 on paging zone controller 103 to transmit an unregister message to paging zone controller 102 informing paging zone controller zone 102 that wireless set 111 is no longer in paging zone 127. In a second embodiment, wireless set 111 determines when it has switched paging zones by interrogating the paging zone numbers transmitted by each base station. When wireless set 111 determines that it is now registering on a base station in a different paging zone, wireless set 111 informs paging zone controller 103 that this is a paging zone switch by including this indication in its registration request. In response to the indication of a paging zone switch, paging zone controller 103 informs central computer 101 that wireless set 111 is now in paging zone 128. Central computer 101 does not inform paging zone controller 102 that wireless set 111 is no longer in paging zone 127. Rather, after a predetermined period of time when there is no activity from wireless set 111, paging zone controller 102 will remove wireless set 111 from the table that identifies wireless set in paging zone 127.

Figure 2:
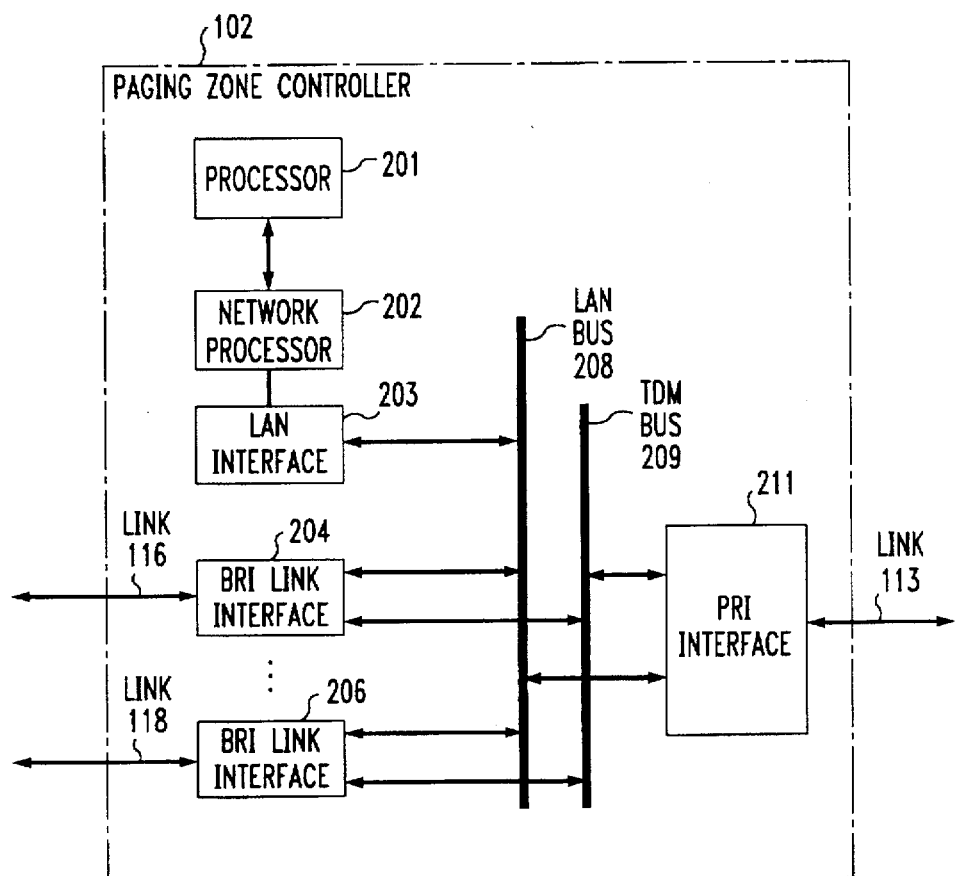
FIG. 2 illustrates, in block diagram form, the internal structure of a paging zone controller.

FIG. 2 illustrates in greater detail paging zone controller 102. As illustrated in FIG. 2, link 113 interfaces paging zone controller 102 to central computer 101 via switching network 105 is a PRI link that is terminated within paging zone controller 102 by PRI interface 211. Links 116–118 that interconnect paging zone controller 102 to base stations 104–107 are illustrated as being a single BRI link each terminated within paging zone controller 102 by a BRI link interface such as BRI interface 204. Each BRI link has two B channels which allows each base station to have two active calls and a D signaling channel for communicating control information. If the base stations can have more than two active calls at any one time, additional BRI links can be utilized to each base station or a PRI link can be utilized.

Voice connections are made between switching network 105 and a BRI link such as link 116 via BRI link interface 204, TDM bus 209, and PRI interface 211. PRI link interface 211 and BRI link interfaces 204–206 communicate information on TDM bus 209 in assigned time slots. PRI interface 211 communicates the information in the time slots to and from switching network 105 via link 113. Processor 201 via network processor 202, LAN interface 203 and LAN bus 208 controls the operation of the link interfaces by the transmission of signaling messages. The signaling messages are ISDN messages that are communicated via LAN bus 208, LAN interface 203, and network processor 201 to and from processor 201 with the link interfaces. For example, an incoming call is signaled by a setup message received by PRI interface 211. PRI interface 211 then transmits the setup message to processor 201 via LAN bus 208, LAN interface 203, and network processor 202. Similarly, processor 201 utilizes ISDN messages for signaling the base stations via network processor 202, LAN interface 203, LAN bus 208, and the BRI link interface to which the base station is interconnected.

Figure 3:
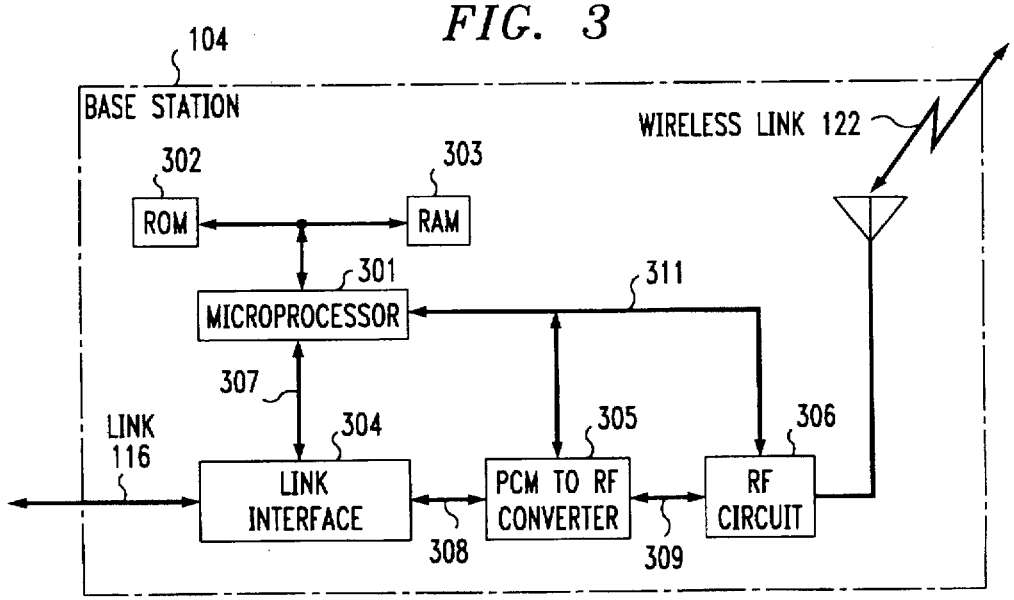
FIG. 3 illustrates, in block diagram form, the internal structure of a base station.

FIG. 3 illustrates in greater detail base station 104. Link interface 304 interfaces link 116 which interconnects base station 104 to BRI link interface 204 of FIG. 2. Link interface 304 is responsive to the B channels of link 116 to communicate these B channels via bus 308 with PCM to RF converter 305. This converter converts the PCM encoding on the B channels to the encoding utilized by the wireless sets. Further, link interface 304 communicates the D channel of link 116 to microprocessor 301. Microprocessor 301 is responsive to the messages being communicated with processor 201 of paging zone controller 102 to process these messages utilizing program and data stored in ROM 302 and RAM 303. Microprocessor 301 controls PCM to RF converter 305 and RF circuit 306 via bus 311. Microprocessor 301 transmits control messages for the wireless sets to PCM to RF converter 305 which converts these messages to the messaging protocol utilized by the wireless sets. RF circuit 306 maintains wireless links such as wireless link 122 with the wireless sets that are registered via base station 104.

Figure 4:
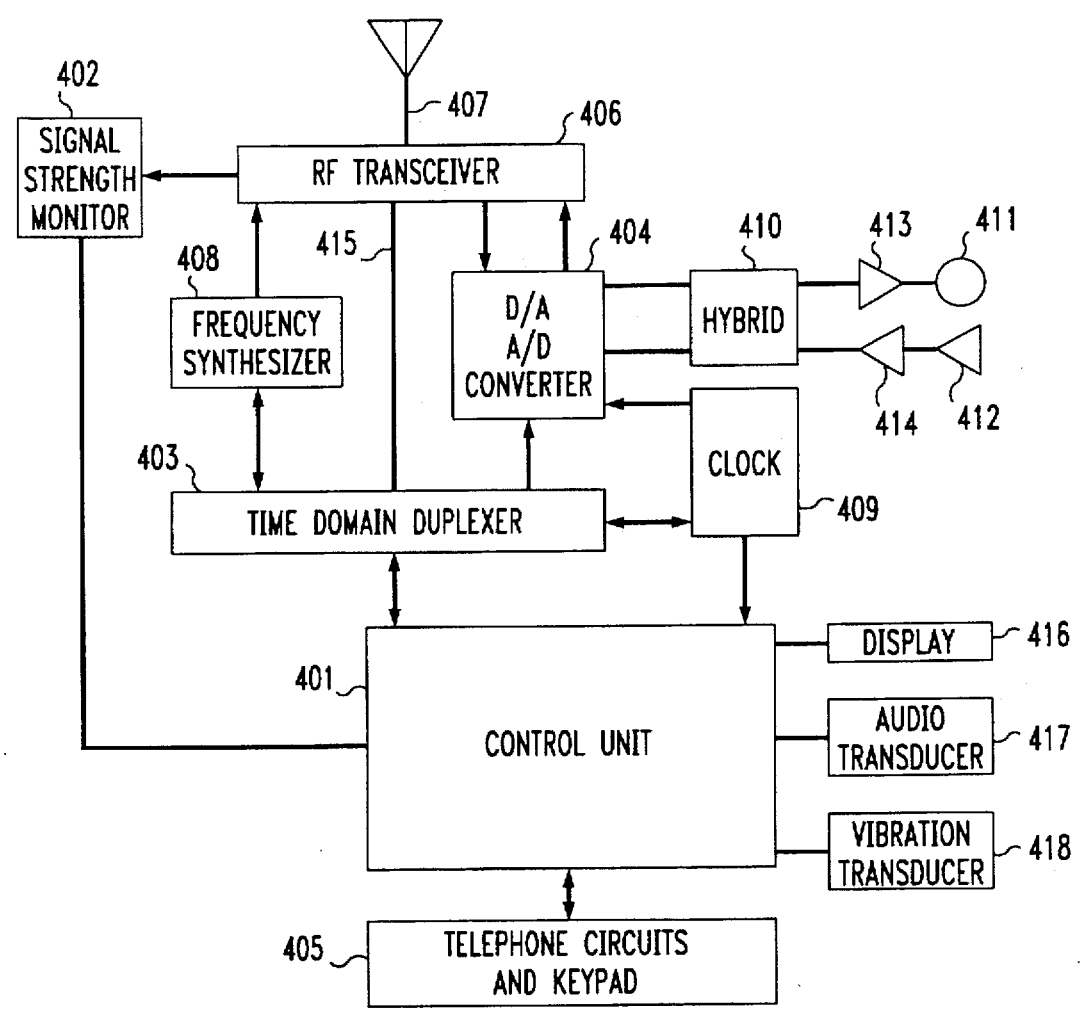
FIG. 4 illustrates, in block diagram form, the internal structure of a wireless set.

FIG. 4 illustrates wireless set 111 in greater detail. Components in this unit include control unit 401 and clock 409 for providing synchronization to: (1) control unit 401, (2) Time Domain Duplexer (TDD) 403, and (3) combined digital-to-analog and analog-to-digital (D/A+A/D) converter 404. Also included in wireless set 11 are RF transceiver 406, antenna 407 and frequency synthesizer 408. Telephone circuits and keypad section 405 permits dialing telephone digits and actuating control keys for placing and receiving telephone calls. Display 416, audio transducer 417, and vibration transducer 418 are utilized by control unit 401 to provide feedback to the user and to alert the user of various situations. The user is given the capability of muting audio transducer 417 in which case, control unit 401 will utilize vibration transducer 418 to alert the caller to incoming calls, etc.

Transceiver 406 comprises both an RF transmitter and an RF receiver. Transceiver 406 demodulates voice signals transmitted by a base station and couples these signals via the D/A section of converter 404 and hybrid 410 on to loudspeaker 412. Transceiver 406 receives its input analog speech signals from microphone 411. These analog speech signals are coupled to the transceiver via hybrid 410 and the A/D section of converter 404. Converter 404 converts the analog signals to digital signals which are then transmitted to RF transceiver 406. Conventional amplifiers 413 and 414 are employed for amplifying the analog speech signals obtained from microphone 411 and provided to loudspeaker 412. Control messages are transferred via time domain duplexer 403 to control unit 401.

Figure 5:
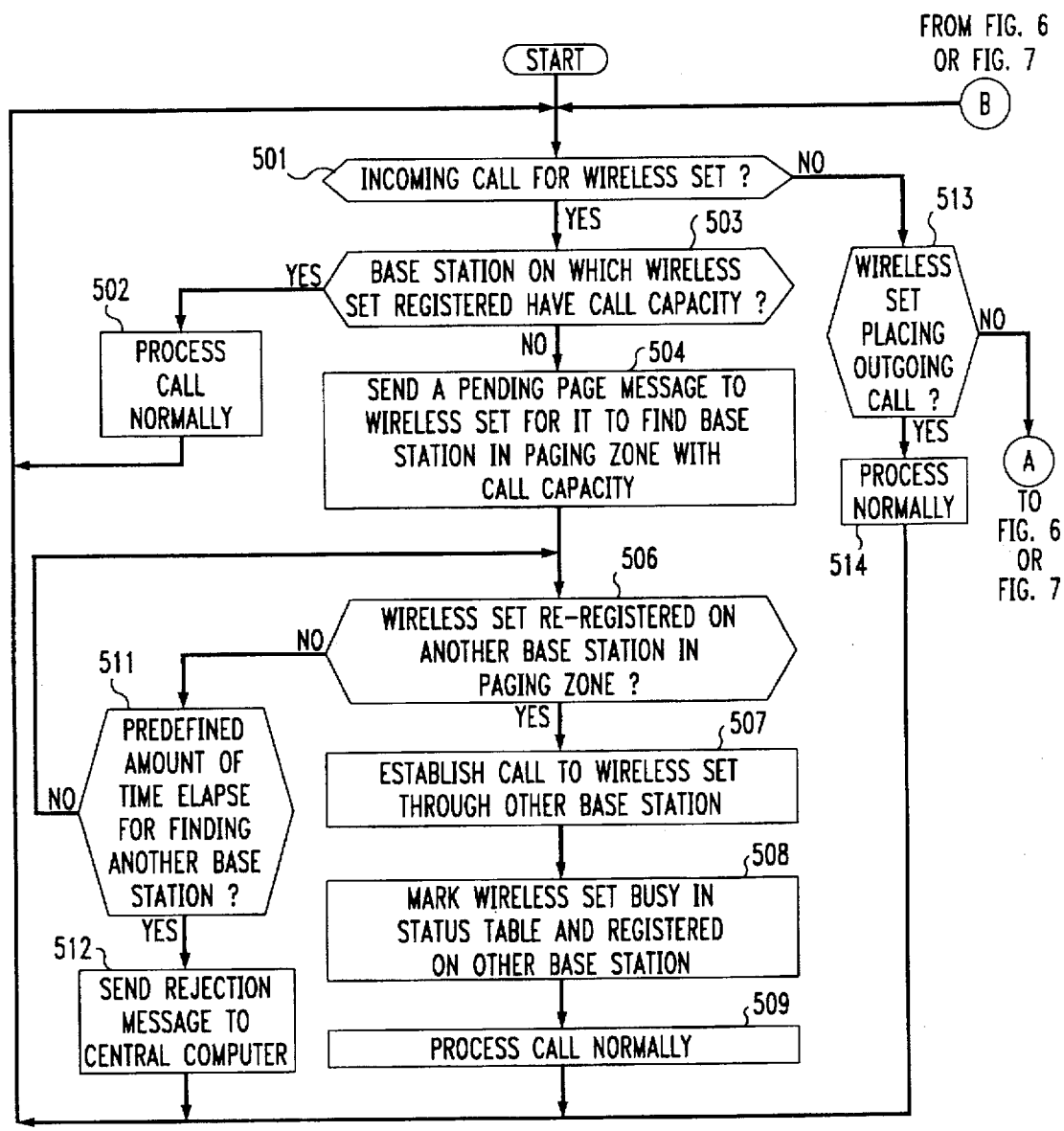
FIGS. 5, 6, and 7 illustrate the operations of a paging zone controller.
Figure 6:
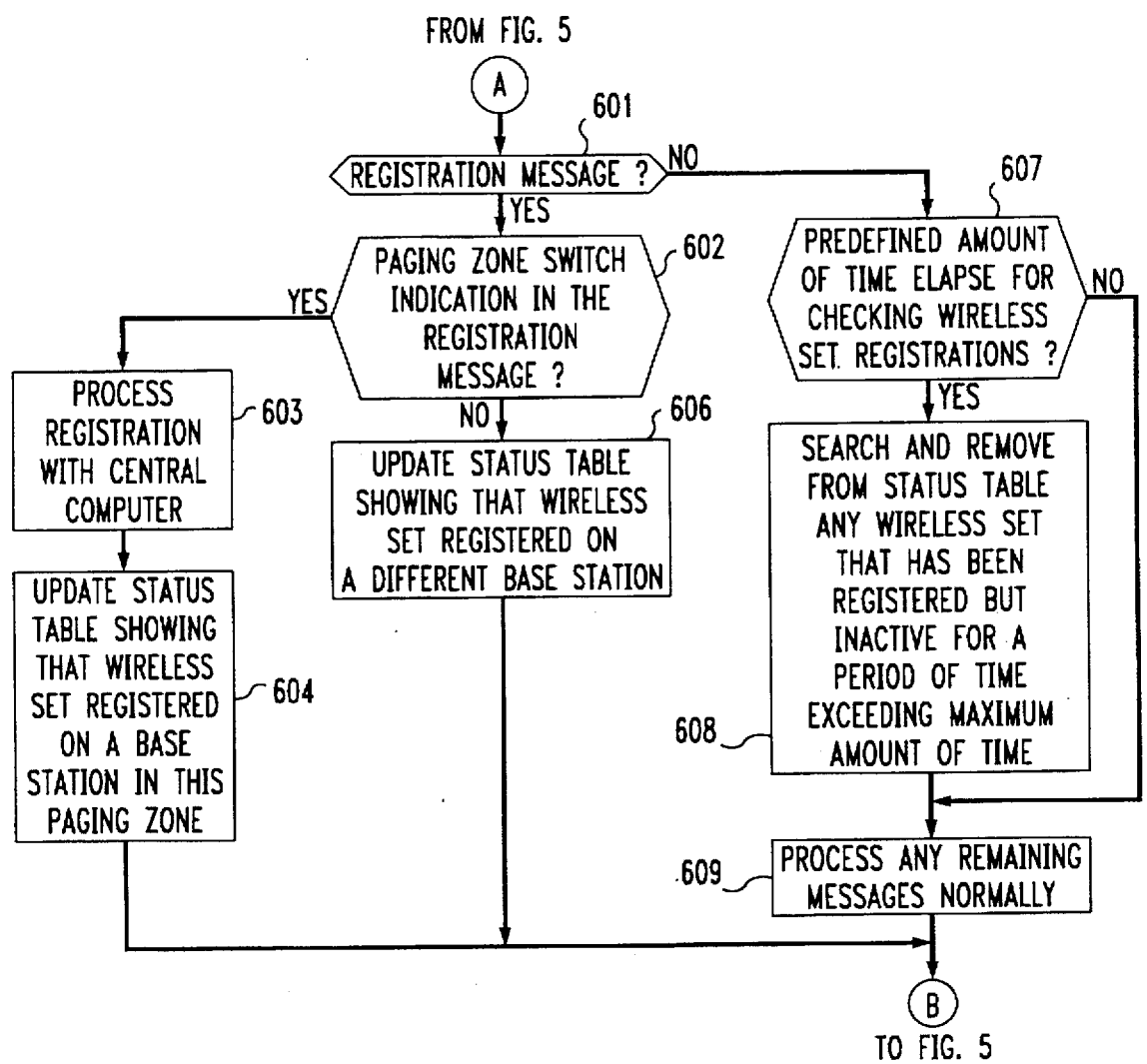
Figure 7:
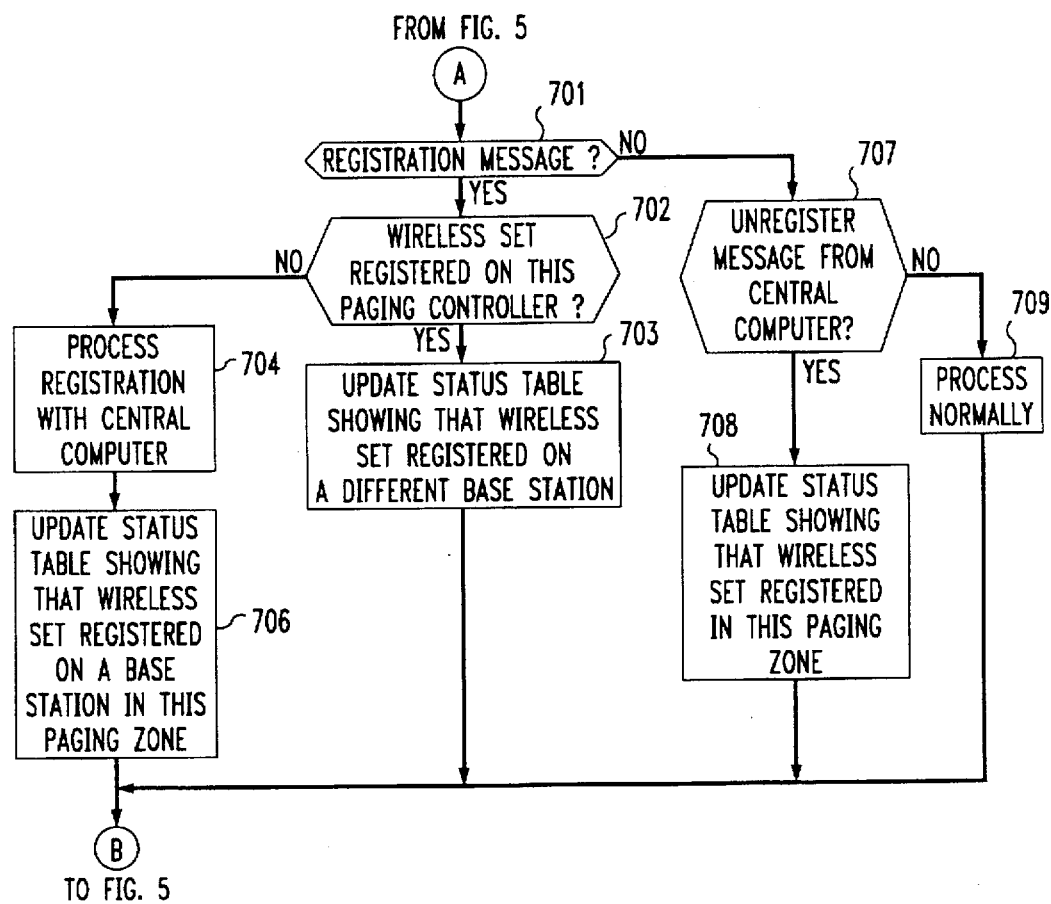

FIGS. 5, 6, and 7 illustrate the operations performed by a paging zone controller. Upon receipt of a message, decision block 501 determines if the message designates that there is an incoming call for a wireless set. This would normally be in the form of a setup message. If the answer is yes, block 503 determines if the base station on which the wireless set is registered has the call capacity to complete the call to the wireless set. If the answer is yes, block 502 processes the call in a normal manner. If the answer in decision block 503 is no, block 504 sends a pending page message to the wireless set via the base station on which the wireless set is presently registered. The pending page message informs the wireless set that it should find and reregister on a base station within the paging zone that has call capacity to allow the incoming call to be completed to the wireless set. After execution of block 504, decision block 506 determines if the wireless set has reregistered on another base station in the paging zone. If the answer is no, decision block 511 determines if the amount of time allowed for a wireless set to find another base station has elapsed. If the answer is no, control is transferred back to decision block 506. If the answer in decision block 511 is yes, block 512 sends a rejection message to central computer 101 before returning control back to decision block 501.

Returning to decision block 506, if the answer in decision block 506 is yes, block 507 establishes the incoming call to the wireless set through the other base station. Block 508 then marks the wireless set as busy in the status table of FIG. 9 and registered on the other base station. Block 508 updates columns 902–904 of FIG. 9. Column 901 already contains the identity of the wireless set. Finally, block 509 processes the incoming call in a normal manner.

Returning to decision block 501, if the answer in decision block 501 is no, control is transferred to decision block 513 which determines if the wireless set is placing an outgoing call. If the answer is yes, block 514 processes this call in a normal manner. If the answer in decision block 513 is no, control is transferred to either decision block 601 if the second embodiment of the invention is being utilized or to block 701 of FIG. 7 if the first embodiment of the invention is being utilized. Assuming that the second embodiment of the invention is being utilized, block 601 determines if a registration message has been received. If the answer in decision block 601 is yes, decision block 602 determines if a paging zone switch indication was included in the registration message. This indication is transmitted by the wireless set when the wireless set registers on a base station in a different zone from what the wireless set had been registered. If the answer is yes in decision block 602, block 603 processes the registration with central computer 101, and block 604 updates the status table to show that the wireless set is now registered on the base station in this paging zone. After execution of block 604, control is transferred back to decision block 501 of FIG. 5. Returning to decision block 602, if the answer is no, block 606 updates the status table to show that the wireless set is registered on a different base station. The paging zone switch indication defines to the paging zone controller that the wireless set has simply transferred from one base station to another base station within the paging zone. After execution of block 606, control is transferred back to block 501 of FIG. 5.

Returning to decision block 601, if the answer is no, control is transferred to decision block 607. The latter decision block determines if a predefined amount of time has elapsed for checking wireless set registrations. Since the paging zone controller receives no indication from central computer 101, when a wireless set shifts registration from the paging zone controller executing FIG. 6 to another paging zone controller, it is necessary for the paging zone controller to maintain a time dated list of the wireless set registrations in the status table. If the answer in decision block 607 indicates that some of the wireless sets have been registered but inactive for an amount of time exceeding the predefined amount, decision block 608 searches and removes the references to these wireless sets from the status table. After execution of block 608, block 609 processes any remaining messages in a normal manner before transferring control back to decision block 501 of FIG. 5. If the answer in decision block 607 is no, control is transferred to block 609 whose operations have just been described.

If the first embodiment of the invention is being utilized, when the answer is no in decision block 513, control is transferred to decision block 701 of FIG. 7. The latter decision block determines if a registration message was received. If a registration message was received, control is transferred to decision block 702 which determines if the wireless set is registered on this paging controller. If the answer is no, control is transferred to block 704 which processes the registration with the central computer. Next, block 706 updates the status table to show that the wireless set is now registered on a base station within this paging zone. The status table used by the first embodiment is the same as the status table illustrated in FIG. 9 with the exception that there is no column 904. Returning to decision block 702, if the answer is yes, block 703 updates the status table to show that the wireless set is registered on a different base station. After execution of blocks 703 or 706, control is transferred back to decision block 501 of FIG. 5.

Returning to decision block 701, if the answer is no, control is transferred to decision block 707. Since central computer 101 has to make certain that the status tables of the paging zone controllers never have duplicate entries showing that the same wireless set is registered in more than one paging zone, it is necessary for central computer 101 to transmit out the unregister message to a paging zone controller when a wireless set ceases to be registered in the paging zone controlled by that paging zone controller. Decision block 707 determines if an unregister message has been received from the central computer. If the answer is yes, block 708 updates the status table to show that the wireless is no longer registered in this paging zone. After execution of block 708, control is transferred back to decision block 501 of FIG. 5. Returning to decision block 707, if the answer is no, block 709 processes the message in a normal manner before returning control to decision block 501 of FIG. 5.

Figure 8:
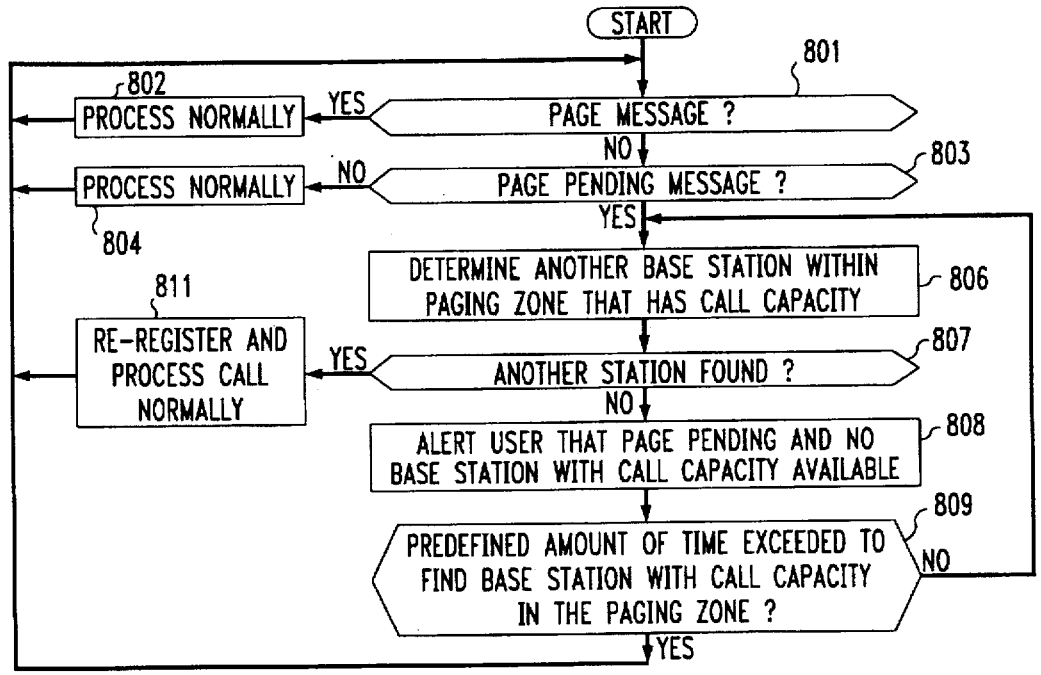
FIG. 8 illustrates the operations of a wireless set.

FIG. 8 illustrates the operations performed by a wireless set with respect to paging. Decision block 801 determines if a page message has been received. If the answer is yes, block 802 processes the page message in a normal manner before returning control back to decision block 801. If the answer in decision block 801 is no, decision block 803 determines if a page pending message has been received. If the answer is no, block 804 processes the message or other stimulus in a normal manner before transferring control back to decision block 801.

If the answer in decision block 803 is yes, block 806 determines if another base station is present within the paging zone that has call capacity so that the incoming call can be completed to the wireless set. Decision block 807 determines if another base station was found. If the answer is yes, block 811 does the reregistration operation and processes the call in a normal manner before returning control back to decision block 801. If another base station was not found, control is transferred to block 808 which alerts the user that a page is pending and no base station with call capacity is available within the paging zone. Decision block 809 then determines if the predefined amount of time allowed for the wireless set to find a new base station has expired. If the answer is no, control is transferred back to block 806. If the answer in block 809 is yes, the wireless set ceases to alert the user and transfers control back to decision block 801.

It is to be understood that the above-described embodiments are merely illustrative of principles of the invention and that other arrangements may be devised by those skilled in the art without departing from the spirit or scope of the invention.

The invention claimed is:

1. A method for paging a plurality of wireless sets each registered on one of a plurality of base stations which are divided into sets with each set being interconnected to an individual one of a plurality of paging zone controllers with each of the paging zone controllers controlling one of a plurality of paging zones and each of the paging zone controllers being interconnected to a wireless switch, the method comprising the steps of:

receiving an incoming call for a first wireless set of the plurality of wireless sets by the wireless switch;

communicating the incoming call by the wireless switch to a first paging zone controller of the plurality of paging zone controllers controlling a first paging zone of the plurality of paging zones upon the first wireless set being registered on a first base station of a first set of base stations that are interconnected to the first paging zone controller;

routing the incoming call by the first paging zone controller to the first wireless set via the first base station upon the first base station having call capacity to handle the incoming call;

transmitting a message to the first wireless set by the first paging zone controller via the first base station upon the first base station not having call capacity to handle the incoming call whereby the message instructs the first wireless set to find and register on a second base station of the first set of base stations that has capacity to handle the incoming call;

determining and re-registering on the second base station by the first wireless set; and routing the incoming call by the first paging zone controller to the first wireless set via the second base station.

2. The method of claim 1 further comprises the step of alerting by the first wireless set a user upon a second base station not being determined.

3. The method of claim 1 further comprises the step of processing a registration of the first wireless set on the first base station with the wireless switch by the first paging zone controller upon that registration being the first registration of the first wireless set in the first paging zone; and the step of re-registering on the second base station comprises the step of processing that registration only within the first paging zone controller.

4. The method of claim 3 further comprises the steps of registering by the first wireless set on a third base station of a second set of base stations controlled by a second paging zone controller of the plurality of paging zone controllers in a second paging zone of the plurality of paging zones;

processing the registration by the second paging zone controller with the wireless switch;

informing the first paging zone controller by the wireless switch that the first wireless set is now registered in the second paging zone; and eliminating reference to first wireless set as being registered in the paging zone by the first paging zone controller.

5. The method of claim 3 further comprises the steps of registering by the first wireless set on a third base station of a second set of base stations controlled by a second paging zone controller of the plurality of paging zone controllers in a second paging zone of the plurality of paging zones whereby the registration is initiated by the first wireless set transmitting a registration message indicating a paging zone switch to the third base station; and processing the registration by the second paging zone controller with the wireless switch whereby the wireless switch does not inform the first paging zone controller that the first wireless set is no longer registered in the first paging zone.

6. The method of claim 5 further comprises the steps of determining ones of the plurality of wireless sets registered in the first paging zone that have not been active for a predetermined period of time; and removing the indication for each of the determined ones of the plurality of wireless sets of being registered in the first paging zone by the first paging zone controller.

7. A wireless system for paging a plurality of wireless sets each registered on one of a plurality of base stations which are divided into sets with each set being interconnected to an individual one of a plurality of paging zone controllers with each of the paging zone controllers controlling one of a plurality of paging zones and each of the paging zone controllers being interconnected to a wireless switch, comprising:

means in the wireless switch for receiving an incoming call for a first wireless set of the plurality of wireless sets;

means in the wireless switch for communicating the incoming call to a first paging zone controller of the plurality of paging zone controllers controlling a first paging zone of the plurality of paging zones upon the first wireless set being registered on a first base station of a first set of base stations that are interconnected to the first paging zone controller;

means in the first paging zone controller for routing the incoming call to the first wireless set via the first base station upon the first base station having call capacity to handle the incoming call;

means in the first paging zone controller for transmitting a message to the first wireless set via the first base station upon the first base station not having call capacity to handle the incoming call whereby the message instructs the first wireless set to find and register on a second base station of the first set of base stations that has capacity to handle the incoming call;

means in the first wireless set for determining and re-registering on the second base station; and means in the first paging zone controller for routing the incoming call to the first wireless set via the second base station.

8. The wireless system of claim 7 further comprises means in the first wireless set for alerting a user upon a second base station not being determined.

9. The wireless system of claim 7 further comprises means in the first paging zone controller for processing a registration of the first wireless set on the first base station with the wireless switch upon that registration being the first registration of the first wireless set in the first paging zone; and the means for re-registering on the second base station comprises means for processing that registration only within the first paging zone controller.

10. The wireless system of claim 9 further comprises means in the first wireless set for registering on a third base station of a second set of base stations controlled by a second paging zone controller of the plurality of paging zone controllers in a second paging zone of the plurality of paging zones;

means in the second paging zone controller for processing the registration with the wireless switch;

means in the wireless switch for informing the first paging zone controller that the first wireless set is now registered in the second paging zone; and means in the first paging zone controller for eliminating reference to first wireless set as being registered in the paging zone.

11. The wireless system of claim 9 further comprises means in the first wireless set for registering on a third base station of a second set of base stations controlled by a second paging zone controller of the plurality of paging zone controllers in a second paging zone of the plurality of paging zones whereby the registration is initiated by the first wireless set transmitting a registration message indicating a paging zone switch to the third base station; and means in the second paging zone controller for processing the registration with the wireless switch whereby the wireless switch does not inform the first paging zone controller that the first wireless set is no longer registered in the first paging zone.

12. The wireless system of claim 11 further comprises means for determining ones of the plurality of wireless sets registered in the first paging zone that have not been active for a predetermined period of time; and means in the first paging zone controller for removing the indication for each of the determined ones of the plurality of wireless sets of being registered in the first paging zone.

\* \* \* \* \*